United States Patent
Zwick (12) 
(10) Patent No.: US 9,908,460 B2
(45) Date of Patent: Mar. 6, 2018

(54) MOTOR VEHICLE LIGHT WITH A LIGHT CONDUCTOR AND A SHIELD THAT IS VISIBLE THROUGH THE LIGHT CONDUCTOR

(71) Applicant: Automotive Lighting Reutlingen GmbH, Reutlingen, DE (US)

(72) Inventor: Hubert Zwick, Stuttgart (DE)

(73) Assignee: Automotive Lighting Reutlingen GmbH, Reutlingen (DE)

( * ) Notice: Subject to any disclaimer, the term of this patent is extended or adjusted under 35 U.S.C. 154(b) by 72 days.

(21) Appl. No.: 14/085,045

(22) Filed: Nov. 20, 2013

(65) Prior Publication Data
US 2014/0140084 A1 May 22, 2014

(30) Foreign Application Priority Data
Nov. 22, 2012 (DE) .................. 10 2012 221 389

(51) Int. Cl.
*B60Q 1/26* (2006.01)
*F21S 8/10* (2006.01)

(52) U.S. Cl.
CPC .............. *B60Q 1/26* (2013.01); *F21S 48/225* (2013.01); *F21S 48/2237* (2013.01);
(Continued)

(58) Field of Classification Search
CPC ...... B60Q 1/26; F21S 48/2237; F21S 48/225; F21S 48/2268; F21S 48/2281; F21S 48/2287; F21S 48/236; F21S 48/2212; F21S 48/1329; F21S 48/24; G02B 6/38; G02B 6/36; G02B 6/61; G02F 2001/34; G02F 1/133615; G02F 2001/133607; F21V 5/04; F21V 7/0091; F21Y 2115/10
See application file for complete search history.

(56) References Cited

U.S. PATENT DOCUMENTS 5,806,955 A * 9/1998 Parkyn, Jr. ......... G02B 19/0028
362/23.16
6,299,334 B1 * 10/2001 Schwanz et al. .............. 362/511
(Continued)

FOREIGN PATENT DOCUMENTS

DE 197 40 317 C1 2/1999
DE 102 51 849 A1 5/2004
(Continued)

OTHER PUBLICATIONS

German Application 10 2012 221 389.9 Examination Report dated Jun. 28, 2013.

*Primary Examiner* — Anh Mai
*Assistant Examiner* — Fatima Farokhrooz
(74) *Attorney, Agent, or Firm* — Howard & Howard Attorneys PLLC (57) ABSTRACT

Presented is a motor vehicle light with a light source, a light conductor, which comprises a bordering decoupling volume opposite of a first side and a second side lying opposite the second side, wherein the second side comprises decoupling elements, which decouple light distributed about a principal propagation direction, and wherein the motor vehicle light comprises a colored shield which is positioned behind the second side in a direction opposite to the principal propagation direction. The shield is a black shield.

8 Claims, 11 Drawing Sheets

(52) U.S. Cl.
CPC ....... *F21S 48/2268* (2013.01); *F21S 48/2281* (2013.01); *F21S 48/2287* (2013.01); *F21S 48/236* (2013.01)

(56) References Cited

U.S. PATENT DOCUMENTS

| | | | |
|---|---|---|---|
| 7,073,914 B2* | 7/2006 | Pavao | 359/841 |
| 2003/0137824 A1* | 7/2003 | Shinohara | G02B 6/0036 362/611 |
| 2003/0156417 A1* | 8/2003 | Gasquet | F21S 48/2212 362/329 |
| 2004/0004836 A1* | 1/2004 | Dubuc | B64F 1/20 362/249.01 |
| 2005/0152153 A1* | 7/2005 | Amano | 362/520 |
| 2007/0236909 A1* | 10/2007 | Tamura | 362/26 |
| 2008/0106396 A1* | 5/2008 | Hsieh | 340/475 |
| 2011/0032721 A1* | 2/2011 | Koizumi et al. | 362/519 |
| 2011/0235353 A1* | 9/2011 | Fukasawa et al. | 362/494 |
| 2011/0249462 A1* | 10/2011 | Koizumi | B60Q 1/302 362/519 |
| 2012/0155103 A1* | 6/2012 | Okada et al. | 362/518 |
| 2012/0320621 A1* | 12/2012 | Kleo et al. | 362/558 |
| 2013/0128620 A1* | 5/2013 | Kosuge et al. | 362/623 |

FOREIGN PATENT DOCUMENTS

| | | |
|---|---|---|
| DE | 10 2009 005 351 A1 | 8/2009 |
| DE | 10 2009 002 728 A1 | 11/2009 |
| DE | 20 2010 004 343 U1 | 8/2010 |
| DE | 10 2010 007 172 A1 | 10/2010 |

* cited by examiner

MOTOR VEHICLE LIGHT WITH A LIGHT CONDUCTOR AND A SHIELD THAT IS VISIBLE THROUGH THE LIGHT CONDUCTOR

CROSS-REFERENCE TO RELATED APPLICATION

This application is based upon and claims priority to published German Patent Application 10 2012 221 389.9, filed on Nov. 22, 2012.

BACKGROUND OF INVENTION

1. Field of the Invention

The present invention relates to a motor vehicle light.

2. Description of the Related Art

Motor vehicle lights are known in the art. For example, published German Patent Application DE 197 40 317 C1 discloses a light source and a light conductor which includes a decoupling volume that is bordered from a first side and a second side opposite the first side. The second side includes deflection surfaces for diverting incident light toward the first side such that the light is decoupled, and is distributed about a principal emission direction. The light further includes a shield that is arranged behind the second side in a direction opposite to the principal emission direction. The shield is a colored shield and determines the color of the motor vehicle light with the light source switched off, in that it reflects only a portion of the spectrum of the incident white daylight. When the light source is switched on, this affects the color of the light emitted from the motor vehicle light. This is undesirable because it distorts the signal color. In this context, the first and the second side of the light conductor of the light known in the art have been realized as plane-parallel sides. The light of the light source is coupled directly into the light conductor volume, bordered by the plane-parallel sides by a non-curved narrow side of the light conductor.

Light conductors are increasingly used for lights in modern vehicles. Illumination systems of motor vehicles are differentiated into either headlamps or lights. Headlights serve to illuminate the roadway \as to allow drivers to identify obstructions and react accordingly. Lights, on the other hand, serve to indicate to other road users the presence and/or the intended behavior of the motor vehicle. Such lights may be used on the front, on the sides, or on the rear of motor vehicle (for example, a daytime running light is a front light, brake lights and taillights are tail lamps, flashing lights are used on all four sides, and position lamps are used on the sides). Further, with lights in general, a flat image of the illuminated surface is increasingly desirable for some light functions.

The light known in the art has a highly voluminous light conductor, at which the light is coupled in by short side surfaces of the light conductor and is decoupled by a long front side. The emission of light occurs parallel to the coupling surface and therefore approximately perpendicular to the propagation direction of the light to be coupled. The voluminous shape of the light conductor also requires a comparatively large installation space, has a comparatively high mass, and has a comparatively large trans-illuminated light conductor volume. The comparatively large trans-illuminated light conductor volume also results in a corresponding high loss by absorption. Because of the high absorption, a large requirement of light must be coupled in, which must be provided by efficient (and thus expensive) light sources.

SUMMARY OF THE INVENTION

The present invention differs from the prior art cited at the outset in distinct ways. For instance, the shield is realized as a non-reflecting shield which therefore appears black, and the first side of the light conductor includes individual decoupling surfaces which are spatially separated from one another and are offset relative to one another in the principal emission direction. Thus, the deflection surfaces lying in the second side are likewise offset relative to one another in the principal emission direction. The decoupling surfaces and the deflection surfaces are matched to each other and are dimensioned and positioned such that in each case, one of the decoupling surfaces is illuminated from exactly one deflection surface only from the second side. The light conductor includes a focusing volume which lies between the light incident surface and the decoupling volume, which is configured to reduce the aperture angle of the light beam entering into the decoupling volume.

Because the shield is realized as a non-reflecting shield, very little incident sunlight is correspondingly reflected. Consequently, the signal color of the light will be changed less in bright environments than would be otherwise the case with a metallized, colored shield. This results in a high signal effect (particularly for a flashing light) even during insolation. Moreover, this will prevent so-called phantom light effects (where incident sunlight in the light is reflected so awkwardly that it is misinterpreted as a signal by another road user). Further, this results in lower costs result compared to lights with a reflecting shield, since no aluminizing is necessary.

Because the first side has individual decoupling surfaces which are spatially separated from each other and are offset relative to each other in the principal emission direction, and that the deflection surfaces lying in the second side are also offset in relation to each other in the principal emission direction, wherein the decoupling surfaces and the deflection surfaces are matched to each other and are dimensioned and arranged such that in each case one of the decoupling surfaces in each case is illuminated only from one deflection surface from the second side. This results in a flat light conductor area which permits the light to be emitted approximately in the direction of the normal to the surface of the first side, which has a wide and expanded surface compared to the narrow sides of the light conductor. The result is a comparatively large light emitting surface with a comparatively small light conductor volume that is irradiated with light. As a consequence, the losses due to absorption are lower than in the prior art. For this reason, the requirement for lighting current during the coupling process is lower than in the prior art, which results in comparatively lower costs for illumination resources. The comparatively lower transilluminated light conductor volume also results in an advantageous reduced installation space and a lower mass, which likewise lowers production costs. Further, this saves on fuel costs which also lowers the operating cost of a motor vehicle.

Because the light conductor includes a focusing volume which lies between the light incident surface and the decoupling volume (which is configured to reduce the aperture angle of the light beam entering into the decoupling volume), the necessary dimensions for the realization of the light conductor according to the invention also reduce in the principal emission direction as the aperture angle reduces. This results in a reduced installation space requirement in the principal emission direction.

In addition, with the reduced aperture angle, it is also possible to keep the distance between the first side and the second side comparatively small without affecting the efficient optical configuration of the light conductor. This also produces savings of material and mass, which is important with the desired flat light conductor In summation, the present invention results in the advantages of a high signal effect even with insolation, avoiding phantom light effects, a reduction of costs due to several reasons, a lower installation space requirement as well as a lower mass, which not simply reduces the production costs but moreover contributes to fuel savings by lowering the operating costs of a motor vehicle.

Other objects, features and advantages of the present invention will be readily appreciated as the same becomes better understood after reading the subsequent description taken in connection with the accompanying drawings.

It should be readily understood that the above-mentioned features as well as the features still to be discussed below can be utilized not only in the respective specified combination but also in other combinations or even individually, without departing from the scope of the present invention.

BRIEF DESCRIPTION OF THE DRAWINGS

Embodiments of the invention are illustrated in the drawings and will be discussed in detail in the following description. The drawings show as a schematic representation in each case.

DETAILED DESCRIPTION OF THE EMBODIMENTS OF THE INVENTION

Figure 1:
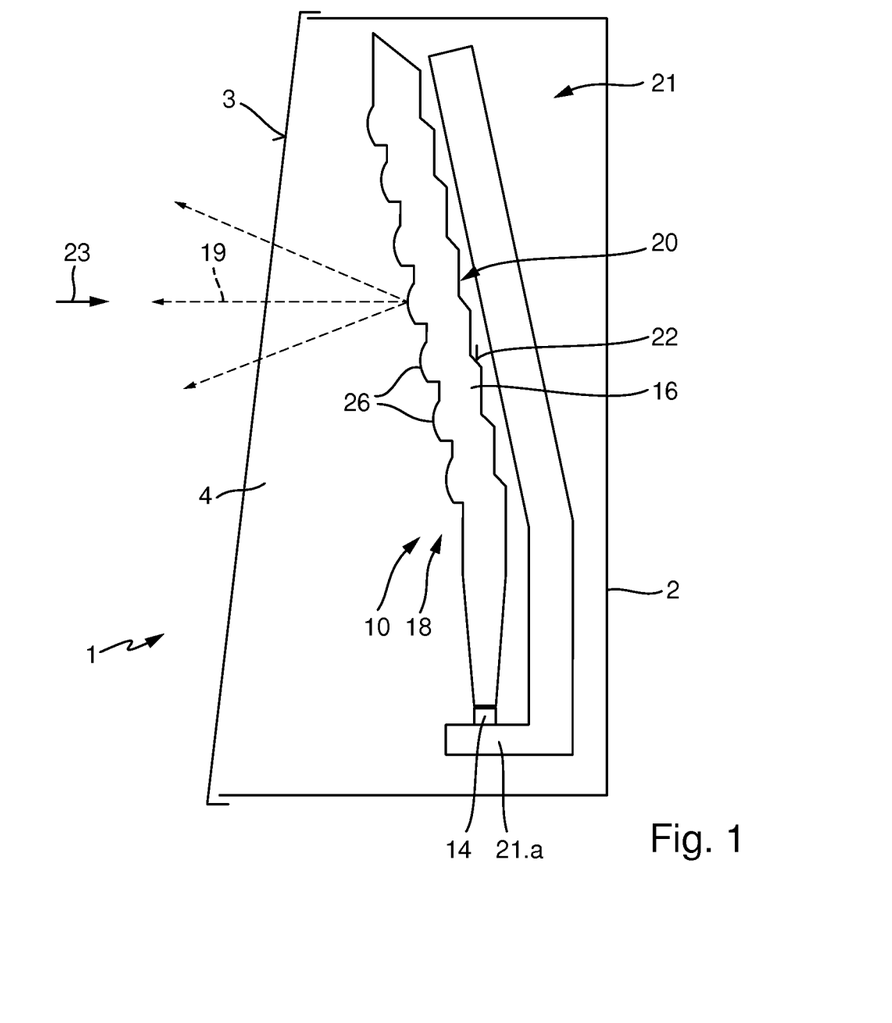
FIG. 1 is a cross-section of an embodiment of a motor vehicle light, when viewed from a line of vision transverse to the direction of emission.

FIG. 1 shows a motor vehicle light 1 with a housing 2 and a transparent cover plate 3, which covers a light outlet opening 4 of the light. The light includes a light conductor 10 and a light source 14, which are arranged in relation to one another so that light of the light source will be coupled into the light conductor.

The light conductor includes a first side 18 and a second side 20 which lies opposite the first side. The first side and the second side border a decoupling volume 16 of the light conductor, wherein the second side includes deflection surfaces 22 which are set up to deflect incident light toward the first side 18 such that light is decoupled there around a principal emission direction 19. The motor vehicle light further includes a shield 21 that is arranged behind the second side 20 in a direction 23 opposite to the principal emission direction 19. The shield 21 is a non-reflecting shield which appears black. In one embodiment, the black shield is designed identically (or at least integrally) with the heat sink 21.a which exists for cooling the semiconductor light source.

The first side 18 has individual decoupling surfaces 26 that are spatially separated from one another and are offset relative to each other in the principal emission direction 19. It should be mentioned that the decoupling surfaces are also arranged offset relative to each other and transverse to the principal emission direction. The deflection surfaces 22 lying in the second side 20 are likewise offset in the principal emission direction and also offset transverse relative to each other. In this way, the decoupling surfaces 26 and the deflection surfaces 22 are matched to each other and are dimensioned and positioned such that in each case one of the decoupling surfaces 26 is illuminated only from exactly one deflection surface 22 from the second side 20.

The semiconductor light source 14 preferably includes one or multiple light emitting diodes. For the lighting functions of motor vehicles, light emitting diodes that have a planar light outlet surface are preferred (which are square and comprises an edge length of 0.3 to 2 millimeters). Depending on the required luminous efficacy and required light colors, one or multiple light emitting diodes emitting isochromatic or heterochromatic light are used as semiconductor light source 14.

In one embodiment, the black shield is designed identically (or at least integrally) with the heat sink 21.a which exists for cooling the semiconductor light source. It is also preferred that the black shield have approximately the same form and size as the light conductor and be arranged behind the light conductor such that it is clearly visible within the light. When the light 1 is viewed from the front, one can see through the glass-clear light conductor onto the heat sink (which is designed to be black) and whereby the unit appears black overall.

In another embodiment, where the form of the black shield is matched to that of the light conductor, the black shield protrudes beyond the light conductor on at least one side (be it top and/or bottom and/or right and/or left) and thus encloses it within a short distance. This design screens the light conductor from the high temperatures prevailing behind the black shield in the headlight, which can occur if the light is installed within the proximity of the internal combustion engine. The light is then emitted across the part of the light conductor that is not covered by the shield. This embodiment has the advantage that, when selecting the material for the light conductor, temperature resistance is not of prime importance; materials which have a low absorption can be used (for example PMMA). This ultimately results in being able to use LEDs with less luminous intensity and a smaller heat sink, which also results in lower costs.

In one embodiment, the light is a flashing light. The advantage of the improved reproduction of the signal color in bright environments has special emphasis here, because the change from "black" to "bright yellow" which occurs during flashing is accompanied by a high contrast, which increases the conspicuity of a flashing light and therefore traffic safety.

Figure 2:
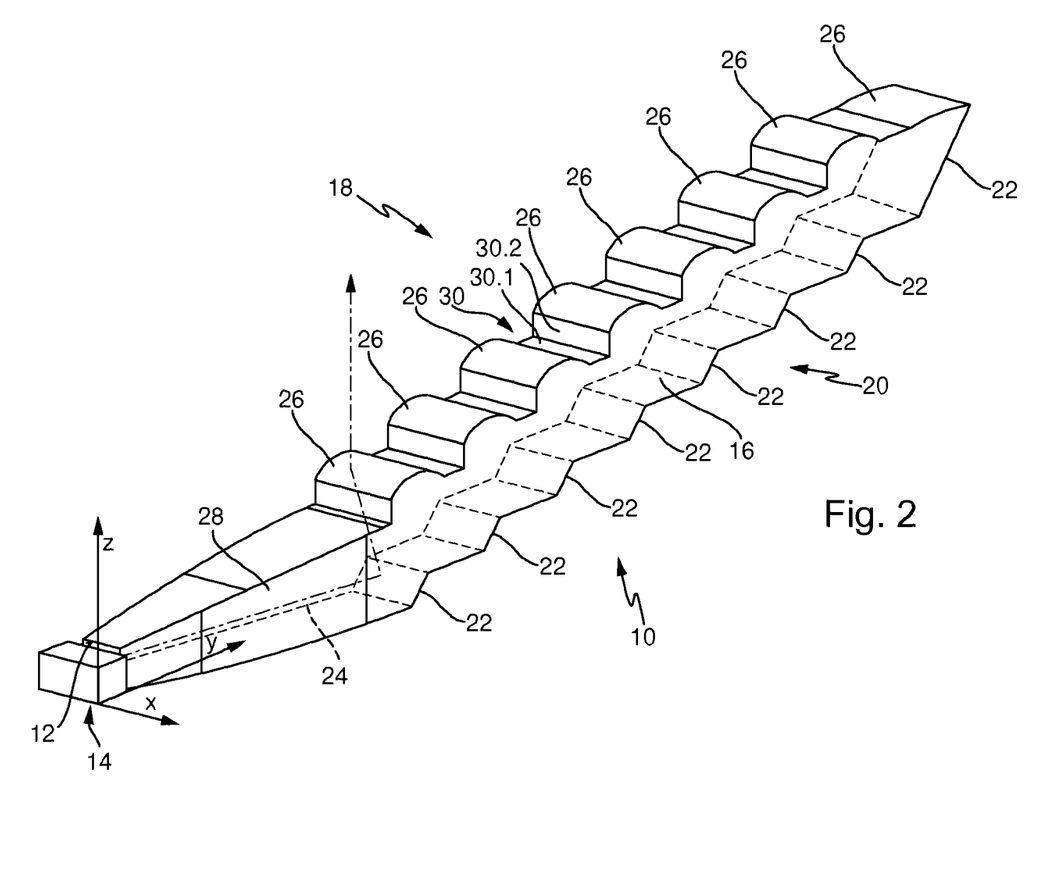
FIG. 2 is a three-dimensional section from the light conductor of the light from FIG. 1.

FIG. 2 illustrates a three-dimensional section from the light conductor of the light from FIG. 1. The light conductor 10 includes a light incident surface 12, in front of which a light source is positioned (in particular a semiconductor light source 14) which is aligned relative to the light incident surface 12 and is arranged close to the light incident surface 12 such that its light is coupled into the light conductor 10. The light 24 of the light source 14, which enters into the decoupling volume, is diverted on the deflection surfaces 22 of the second side 20 to the first side 18 and is decoupled there by the first side 18. In this embodiment, the light incident surface 12 is aligned parallel to an x, z plane, such that the principal propagation direction of the light coupled into the light conductor 10 lies in a direction parallel to a y-direction, and the principal emission direction of the light decoupled by the first side lies parallel to the z-direction. The x-direction, the y-direction, and the z-direction together form a right-handed oriented coordinate system.

The first side 18 has individual decoupling surfaces 26 that are spatially separated from one another and are offset relative to each other in the principal emission direction z, of which in each case each one is illuminated from one deflection surface 22 from the second side 20. The light conductor 10 further includes a focusing volume 28 which lies between the light incident surface 12 and the decoupling volume 16, which is configured to reduce the aperture angle of the beam of light entering into the decoupling volume 16. This effect of the focusing volume 28 occurs because its cross-section (starting from a smallest cross-section formed by the light incident surface 12) becomes continuously larger with increasing distance from the light incident surface 12, until it reaches a size defined by the light incident cross-section of the decoupling volume 16.

Between the light incident surface 12 and the light incident cross-section of the decoupling volume, the light propagating in the light conductor (depending on at what angle to the perpendicular of the light incident surface 12 the light has entered into the light conductor) undergoes either zero, one, or several internal total reflections on the transport surfaces of the focusing volume. No decoupling occurs across the length of the focusing volume, so that the focusing volume to that extent exerts a genuine light conductor function (i.e. a transport function).

Focusing volume 28 cross-sections refer to the cross-section at which the principal propagation direction of the light propagating in the light conductor 10 is perpendicular. In the case of FIG. 1, the surfaces of the cross-sections are therefore parallel to the x, z-plane, in each case. In this context, the enlargement of the cross-section results because the light conductor 10 in the area of the focusing volume 28 becomes broader both in the x-direction as well as in the z-direction with increasing distance of its respective cross-section from the light incident surface 12. For this reason, the walls of the focusing volume 28 virtually diverge with increasing distance from the light incident surface 12. Because of the diverging walls, during each reflection of light on one of the sidewalls of the focusing volume 28, the angle between the light beam and the longitudinal axis of the focusing volume 28 (which is oriented in the y-direction here) is reduced. It is therefore possible that more light can get to the deflection surfaces 22 that are further distant from the light incident surface 12 than would be the case without the focusing effect of the focusing volume 28; because of the focusing volume 28, the aperture angle of the light beam (with which the light beam spreads in the light conductor) is reduced. The focusing volume reduces the divergence of the light beam.

Figure 3:
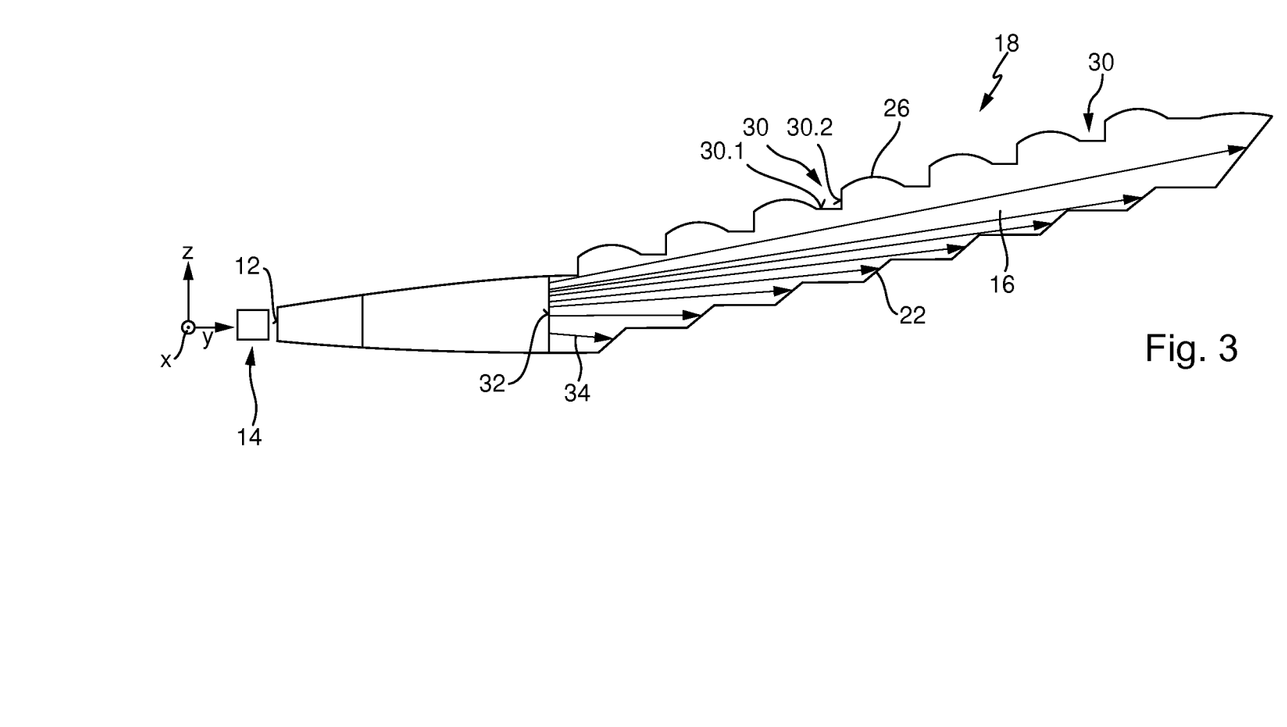
FIG. 3 is a lateral view of the object from FIG. 2.

FIG. 3 illustrates a lateral view of the object from FIG. 2. As mentioned previously, the deflection surfaces 22 are arranged offset stepwise in the principal emission direction z. Each deflection surface 22 thus receives an exclusive partial beam 34 of the light, which comes directly (without previously still being reflected) from the light conductor cross section 32 enlarged relative to the cross-section of the light incident surface 12 on the light incident end of the light decoupling volume 16. Each of these exclusive partial beams 34 are directed from the associated deflection surface 22 to one decoupling surface 26.

This creates sets of pairs from each one deflection surface 22 and each one decoupling surface 26, the luminous design of which can be adapted optimally to the respective illumination task. The deflection surfaces 22 can be level or curved and can thus affect the light distribution in the target area, the aperture angle of the emitted light beam and the distribution of brightness in the luminous surface. The size of the deflection surfaces 22 can also affect the distribution of brightness. The larger a deflection surface 22, the more light it will deflect to its associated decoupling surface 26, and the brighter the associated decoupling surface 26 appears to a viewer.

Similarly, each decoupling surface 26 can be individually adapted to the respective illumination task. In one embodiment, the decoupling surfaces 26 include a form which focuses the light being emitted by the respective decoupling surface 26. This is applicable both for focusing in the y-direction as well as for focusing in the x-direction. In the design illustrated in FIG. 2, the decoupling surfaces along a cross-section the direction of which matches the direction of the light propagated in the light beam that is in the y-direction include a cross-section, which focuses the light being emitted by the respective decoupling surface 26 in the y-direction. In the object of FIG. 2, this effect is achieved by the convex curvature of the decoupling surfaces 26. However, this will not achieve focusing in the x-direction. Measures for focusing in the x-direction will be explained later on.

The pairs from each deflection surface 22 and the associated decoupling surface 26 are dimensioned such that the decoupling surfaces 26 of different pairs appear to be equally bright for light coupled-in by the light incident surface 12. If the decoupling surfaces 26 are the same size. This is especially the case if the deflection surfaces 22 positioned further away from the light incident surface 12 are larger than the deflection surfaces 22 lying closer to the light incident surface 12. Such surface of the deflection surfaces 22 (which grows with increasing distance away from the light incident surface 12) compensates for the decrease of the luminous flux per unit of surface (i.e. the illuminance), which otherwise occurs with increasing distance away from the light incident surface. The larger the deflection surface, the larger the luminous flux that is deflected from this deflection surface.

So that the individual decoupling surfaces 26 get their light from the respective assigned deflection surface 22 (exclusively if at all possible), the decoupling surfaces 26 are also arranged offset stepwise in the principal propagation direction of the light emitted by the first side 18. Thus, the extent of the offset increases with increasing distance from the decoupling surface 26 of the light incident surface 12 in discrete steps. Each decoupling surface 26 has a stepped shading surface 30 for its adjacent decoupling surface that lies between it and the light incident surface 12. The shading surface 30 has two partial surfaces 30.1 and 30.2, which together include an angle. The one partial surface 30.1 is a totally reflecting boundary surface that lies parallel to the x-y plane and which shades the subsequent decoupling surface against light in the direction of light, which would otherwise impinge directly from the focusing volume 28 (and thus without preceding reflection on a deflection surface 22) onto the decoupling surface 26.

Because the conditional stepwise offset caused by the second partial surface 30.2 of the decoupling surfaces 26 and of the deflection surfaces 22 occurs always in the same direction, it is possible to keep the distance between the rows of decoupling surfaces 26 and deflection surfaces 22 small without affecting the efficient optical design. This produces savings of material and mass, which is particularly important with the desired flat light conductors.

As a general rule, the decoupling surfaces 26 can lie both within the aperture angle of the light beam entering into the decoupling volume 16 as well as also outside of the aperture angle of the light beam entering into the decoupling volume 16. The light conductor 10 includes a shading surface 30 to each decoupling surface 26, which forms a part of the first side 18 of the light conductor 10. In one line of vision, which lies in the principal propagation direction y of the light entering into the decoupling volume 16, one partial shading surface 30.1 is arranged between two decoupling surfaces 26 and parallel to the principal propagation direction. In the embodiment illustrated in FIG. 1, all decoupling surfaces 26 include one such shading surface. The light conductor 10 includes multiple decoupling surfaces 26, which are successively positioned in a row, when viewed from the light incident surface 12. The light conductor include one deflection surface 22 and one partial shading surface 30.1 for each decoupling surface.

Figure 4:
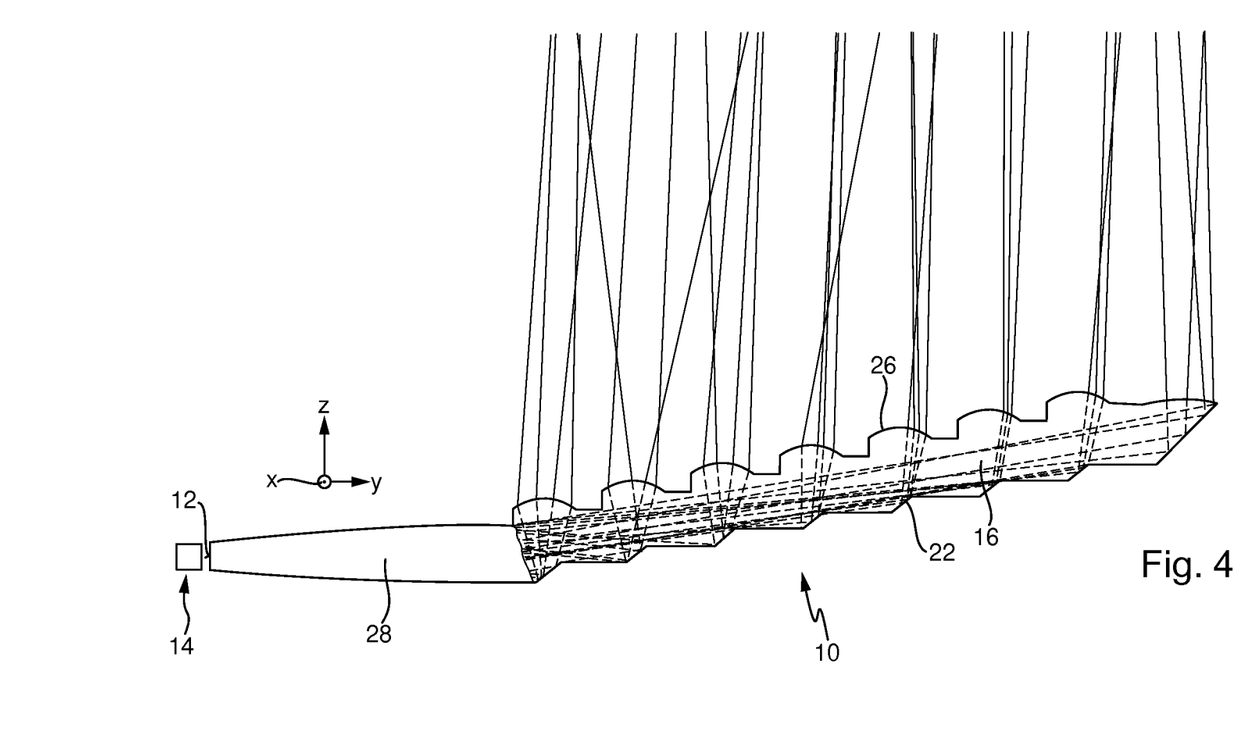
FIG. 4 is the object from FIG. 3 together with the beam paths of light.

FIG. 4 illustrates the object of FIG. 3 together with the beam paths of light. In this context, the parts of the optical paths running within the focusing volume 28 are not represented for reasons of maintaining clarity. FIG. 4 illustrates one design, in which the decoupling surfaces 26 lie outside of the aperture angle of the light beam entering into the decoupling volume 16. FIG. 4 further illustrates beam paths of the light propagating within the light conductor 10, which is coupled into the light conductor 10 by the light incident surface 12. The decoupling surfaces 26 there all lie above the upper marginal beam, which limits the cone of the light spreading within the decoupling volume 16. FIG. 4 thus clarifies the positive effect of the focusing volume 28 in the light path which lies ahead of the decoupling volume 16. The aperture angle of the light cone of the light spreading in the decoupling volume 16 would be larger without the focusing volume 28. Should the decoupling surfaces 26 then still be outside of this light cone (and thus above the marginal beam), they would have to be shifted correspondingly more towards the top (i.e. in the z-direction). This would mean that the light conductor 10 would need more installation space in the z-direction (which is parallel to the principal emission direction there), than would be the case with the light conductor 10 which is illustrated in FIG. 3. The beam paths illustrated in FIG. 4 further clarify how in each case a part of the light coupled into the light conductor 10 by the light incident surface 12 impinges on one deflection surface 22 and is deflected there such that it is decoupled by an associated decoupling surface 26 of the light conductor 10.

FIG. 4 also clarifies that the shading surface 30 ensures in each case that the decoupling surface 26 connecting to the shading surface 30 is impinged exclusively by the light that is deflected from the associated deflection surface 22 onto the respective decoupling surface 26. FIG. 4 further clarifies the beneficial focusing effect of the light conductor illustrated in the parallel direction to the principal propagation direction within the light conductor (which there corresponds to the y-direction).

Figure 5:
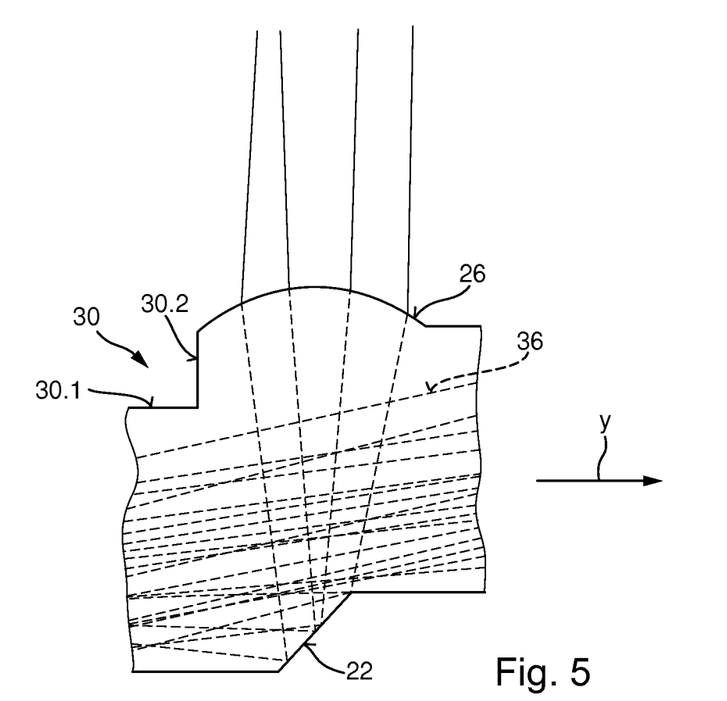
FIG. 5 is a selective enlargement from FIG. 4.

FIG. 5 shows a selective enlargement from FIG. 4, which clarifies the combined effect of deflection surface 22, decoupling surface 26, and shading surface 30. With the object of FIG. 5, the decoupling surface 26 lies above the marginal beam 36 of the light spreading about the principal propagation direction y in the decoupling volume 16 of the light conductor 10. In this context, the step height of the partial shading surface 30.2 compensates for the rise of the marginal beam 36, such that subsequent decoupling surfaces 26 will lie above this marginal beam 36 due to their respectively assigned shading surface 30. However, even if the decoupling surface 26 would lie within the light cone, the shading surface 30 would shade the associated decoupling surface 26 such that the decoupling surface 26 will only be impinged from the light that is deflected from the associated deflection surface 22 onto the decoupling surface 26. FIGS. 4 and 5 thus particularly illustrate that a part of the light impinges onto a deflection surface 22 and is deflected there such that it leaves the light conductor 10 through the decoupling surface 26.

The shading surface 30 provides that the decoupling surface 26 is impinged exclusively (if at all possible) from the light that was deflected from the associated deflection surface 22. This represents an essential element of the invention: because a decoupling surface 26 is created (which can only be impinged from the light that is to be emitted). The negative effects of uncontrolled reflections on the decoupling surfaces 26 will be prevented during the light propagation in the light conductor 10, and/or in the decoupling volume 16 of the light conductor 10. Moreover, the emitted light can be effectively focused, since the origin of the emitted light from the respective associated deflection surface 22, and therefore its approximate direction is determined by the geometry of the arrangement. As was mentioned, the light quantity decoupled from each decoupling surface can be varied by the height of the deflection surface 22 such that all decoupling surfaces 26 appear to be equally bright to a viewer.

Figure 6:
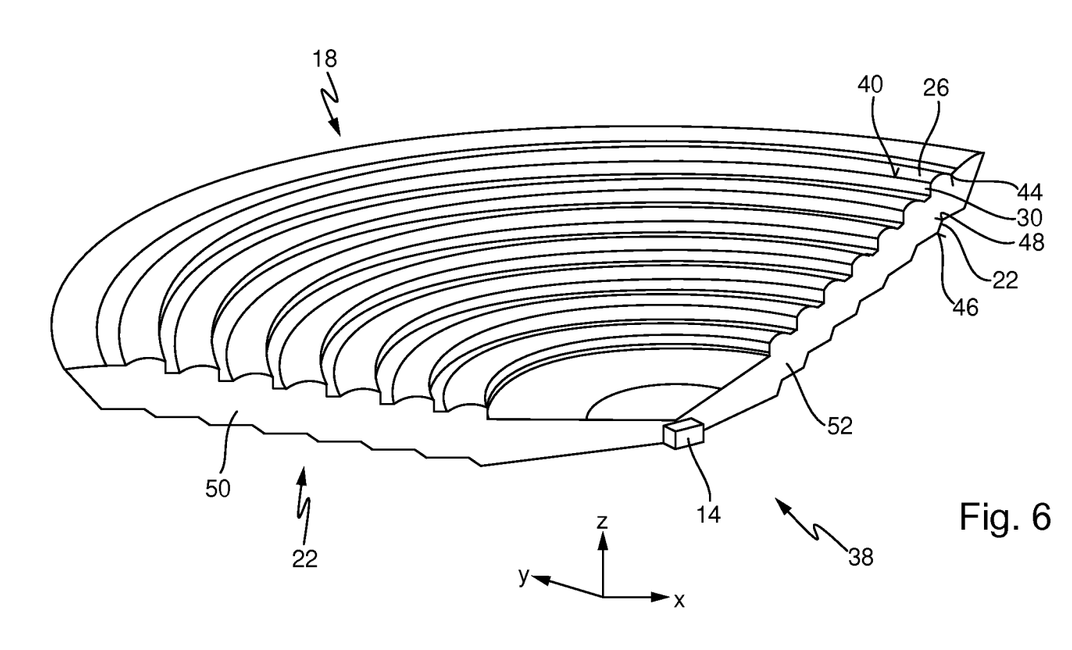
FIG. 6 is a perspective representation of a light conductor of one embodiment of the light.

FIG. 6 illustrates a perspective representation of a light conductor 38 of one embodiment of the light. This light conductor 38 includes the following characteristics: an edge 40 which separates a shading surface 30 from a decoupling surface 26 that is shaded by this shading surface 30, is an angular sector from a first circular arc. One edge 44 limiting this decoupling surface 26 on its side facing away from the shading surface 30 is an angular sector from one second circular arc with a larger radius which is concentric to the first circular arc. The edges 46, 48, bordering the associated deflection surface 22, are angular sectors of further circular arcs running concentric to the first and the second circular arc.

The decoupling surfaces 26 of the light conductor 38 are curved convexly, as are the decoupling surfaces 26 of the light conductor 10. Thus, the convex curvature of the light conductor 38 extends transverse to the circular arc form of the edges 40 and 44, which are bordering the decoupling surfaces. If this light conductor 38 is used in a motor vehicle light, the z-direction corresponds to the principal emission direction, while the y-direction for example is parallel to a vertical axis of the vehicle and the x-direction lies parallel to a transverse axis of the vehicle. The light conductor 38 illustrated in FIG. 6 focuses the light both in the y-direction and also in the x-direction. The cross-sectional view of FIGS. 3 and 4 is also applicable for the light conductor 38.

In the case of the light conductor 38, the cross-section from FIG. 2 can be considered as a radial cross-section.

To a viewer located in the principal emission direction ahead of and viewing the light conductor 38, each beam which impinges onto one of the deflection surfaces 22 (and subsequently onto a decoupling surface 26) appears to originate directly from the semiconductor light source 14. If the circular arcs 40, 44 extend across an adequately large angular width, then the light that propagates within the light conductor from the semiconductor light source 14 in a light acceptance cone centered around the principle propagation direction y within the light conductor 38 will not reach the radially extending boundary surfaces 50 and 52 of the light conductor 38.

With a light conductor 38, illustrated in FIG. 6, a very high focus can be obtained both in the x-direction as well as in the y-direction. It has been shown that 62% of the light quantity from such light conductor 38 supplied from the semiconductor light source 14 is emitted in an angular range which has a quadratic form and where the edge length is 10° in the x-direction and 10° in the y-direction. In this instance, the indication of 62% refers to the light quantity percentage that is emitted from the semiconductor source 14 (this figure also contains the losses occurring at the light incident surface 12).

This achievable focusing is too strong for many light functions. Government regulations, for example, mandate a horizontal width of the light distribution of +/−20 degrees and a vertical height of +/−10 degrees. In this context, the horizontal width corresponds to the x-direction, and the vertical height corresponds to the y-direction. To obtain this type of light distribution with a light conductor based on the light conductor 38 of FIG. 6, the measures for focusing that were undertaken there can be omitted either partially or even altogether.

Figure 7:
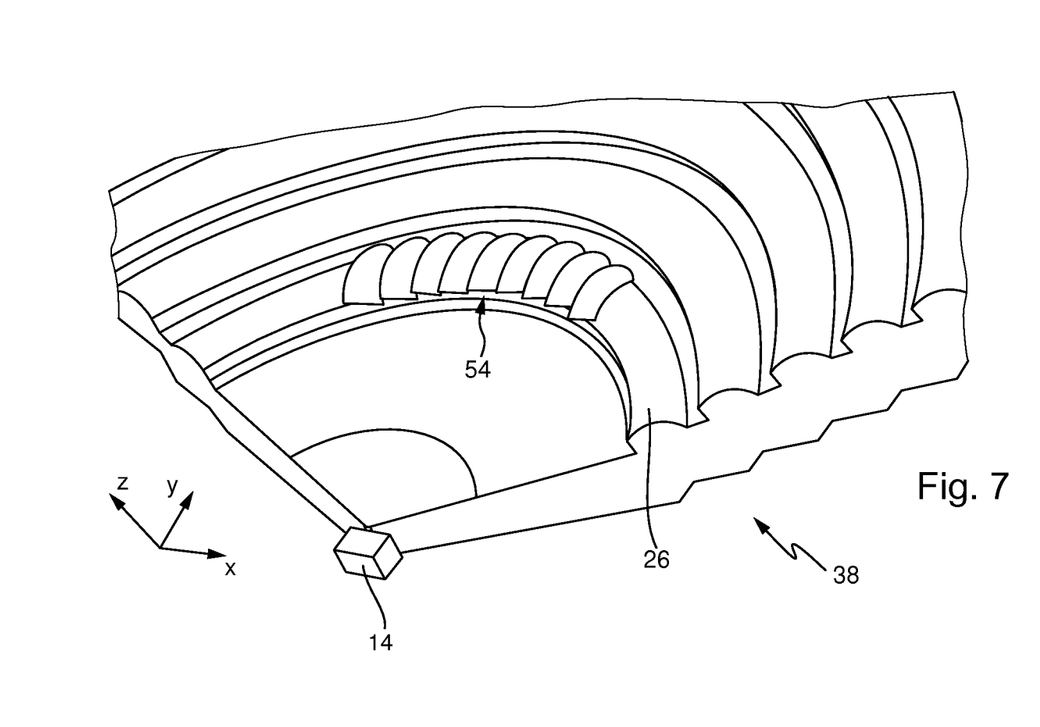
FIG. 7 is a design of the object from FIG. 6.

As an additional alternative, however, it is possible to specifically expand the light distribution with a scattering structure on the decoupling surfaces of the light conductor 38. Such a design has been realized in the embodiment of a light conductor 38 which is represented in FIG. 7 which shows details of a light conductor 38, in which the decoupling surface 26 lying closest to the semiconductor light source 14 includes (in addition to its convexly curved circular arc form) curved scattering structures 54, which are aligned transverse to the circular arcs of the decoupling surface 26 and extend above the convex curved decoupling surface 26. The scattering structures 54 can be applied onto one or multiple convexly curved decoupling surfaces 26. The scattering structures 54 can be used as scattering structures which protrude convexly curved from the decoupling surfaces, or as concavely curved scattering structures that are realized as recesses in the convexly curved decoupling surfaces 26. Using these scattering structures will enlarge the horizontal scattering (i.e. the scattering in the x-direction) such that a spread light distribution results in the x-direction.

Figure 8:
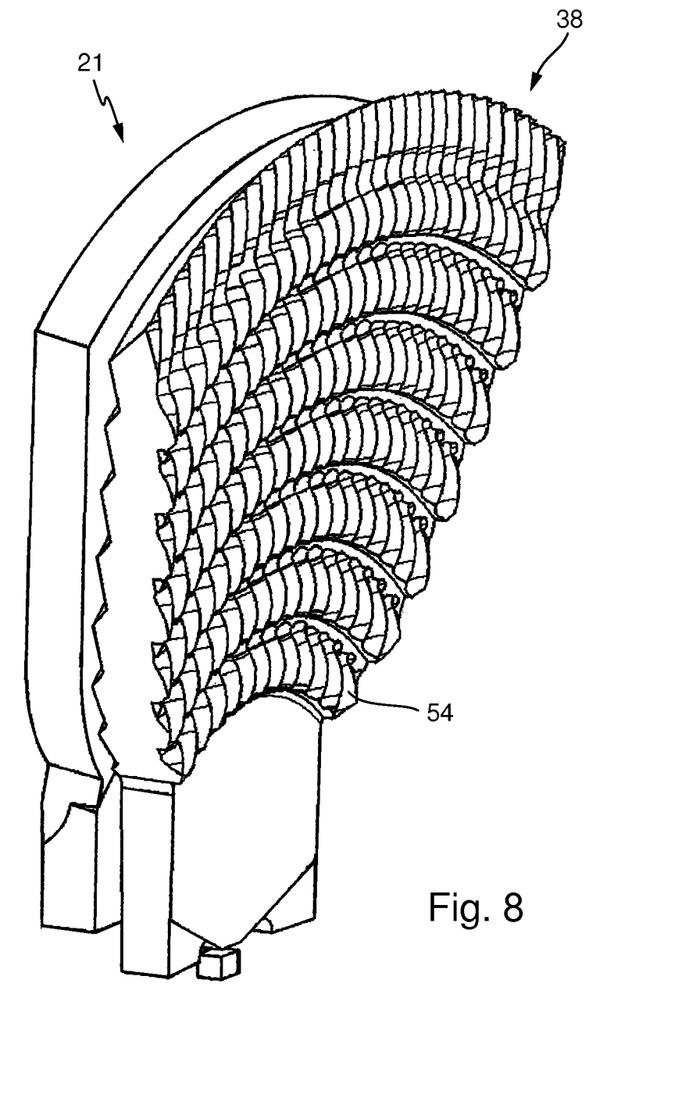
FIG. 8 is a perspective representation of a configuration from a semiconductor light source, a light conductor and a black shield of one embodiment.

FIG. 8 is a perspective representation of a configuration from a semiconductor light source 14, a light conductor 38 and a black shield 21 of one embodiment of a motor vehicle light.

Figure 9:
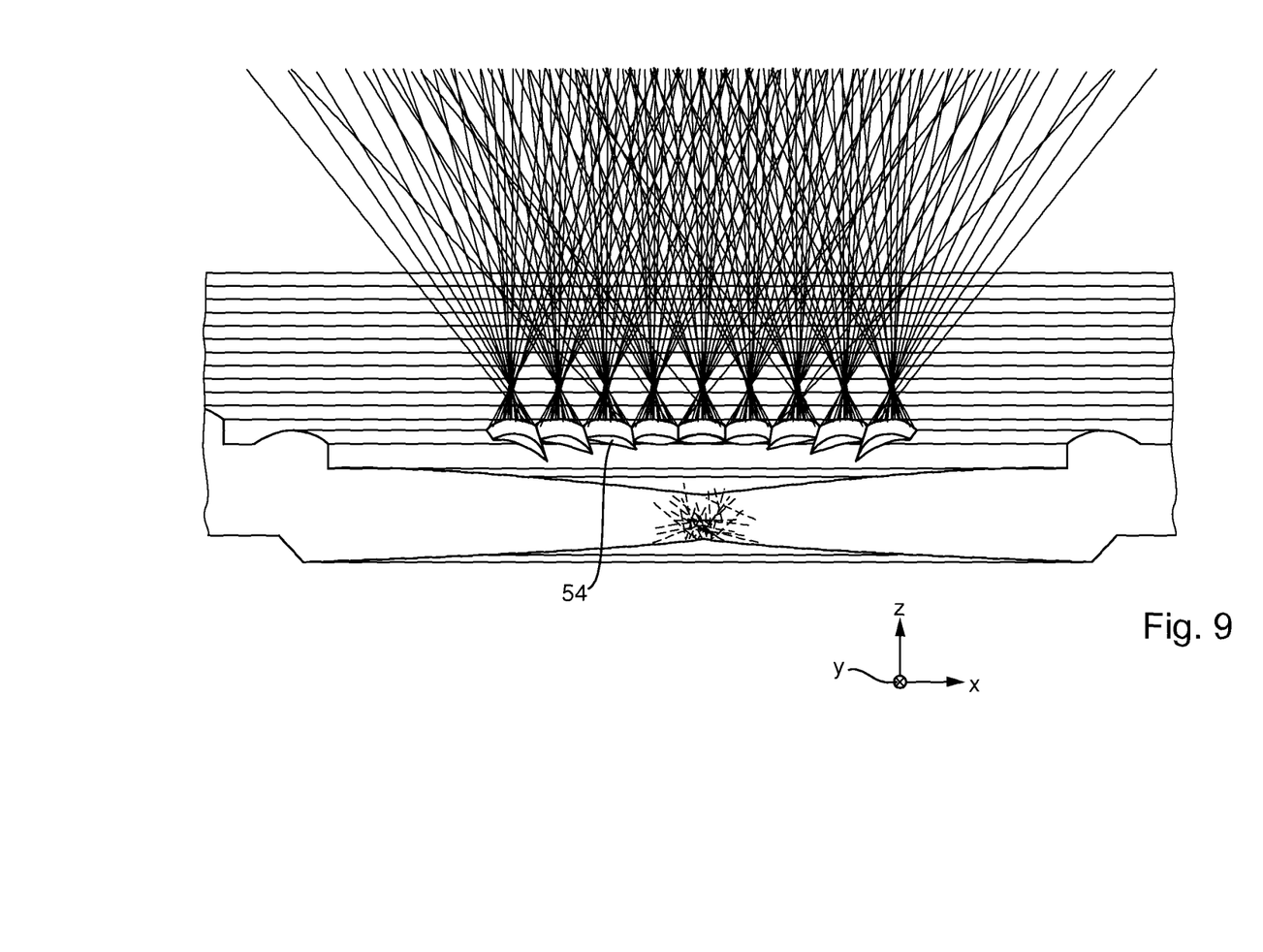
FIG. 9 illustrates different beams of rays emitted from the light conductor according to FIGS. 6-8.

FIG. 9 illustrates different bundles of beams which are emitted from a light conductor 38, as illustrated in FIGS. 6-8. FIG. 9 illustrates different bundles of beams being emitted from the light conductor 38 according to FIG. 8, which elucidate such spread of the light distribution. In any case, the angular width is greater than the value of 10 degrees stated above for obtaining maximum focusing.

The scattering structures 54 are created in that a part of a cylinder is placed onto the existing decoupling surface 26, wherein the part is shaped such that it follows the curvature of the decoupling surface 26. This therefore involves a part which is bent along its cylinder axis (i.e. a part of a toroid). Thus, the bent cylinder axis lies in a plane which is configured through a radius of the circle sector shaped light conductor 38 and the z-direction. It is known in the art that such a cylinder scatters parallel incident light in the (+/−) x-direction. However, the decoupling surface 26 lying below serves for focusing.

The addition of these two structures in the first approximation results in the addition of the modes of operation. FIGS. 7-9 illustrate parts of convex cylinders (concave cylinders would operate the same). Deviations from the circular shape of such scattering cylinders can be utilized for the purpose of illuminating certain angular ranges more than other angular ranges. For example, the section of the circle (which is responsible for the scatter in this specific angular range) will be enlarged. Here, the circular cylinder shaped scattering structures are only one example of possible scattering structures. Other examples include elliptically shaped, parabolically shaped, or free-form shaped, where the position of each surface segment is calculated with respect to its position such that it will scatter incident light from a specific direction towards the inside to a specific direction towards the outside.

In addition to increasing the scattering range, it may also be desirable (such as with an installation that is twisted around the z-direction) to pivot the narrow bundle of beams in its entirety about a specific angle. This can be utilized to equalize an installation condition, for example where the light outlet surface of the light conductor must not be aligned standard to its principal emission direction. This can be caused by design specifications or by problems related to installation space. To achieve this, a further embodiment is characterized in that at least one of the decoupling surfaces 26 of the light conductor 38 includes deflection wedges in addition to its convexly curved circular arc form, which are configured for the purpose of deflecting the light beams during the coupling in from the light conductor 38 which occurs by the light incident surface such as if it were pivoted as a whole.

Figure 10:
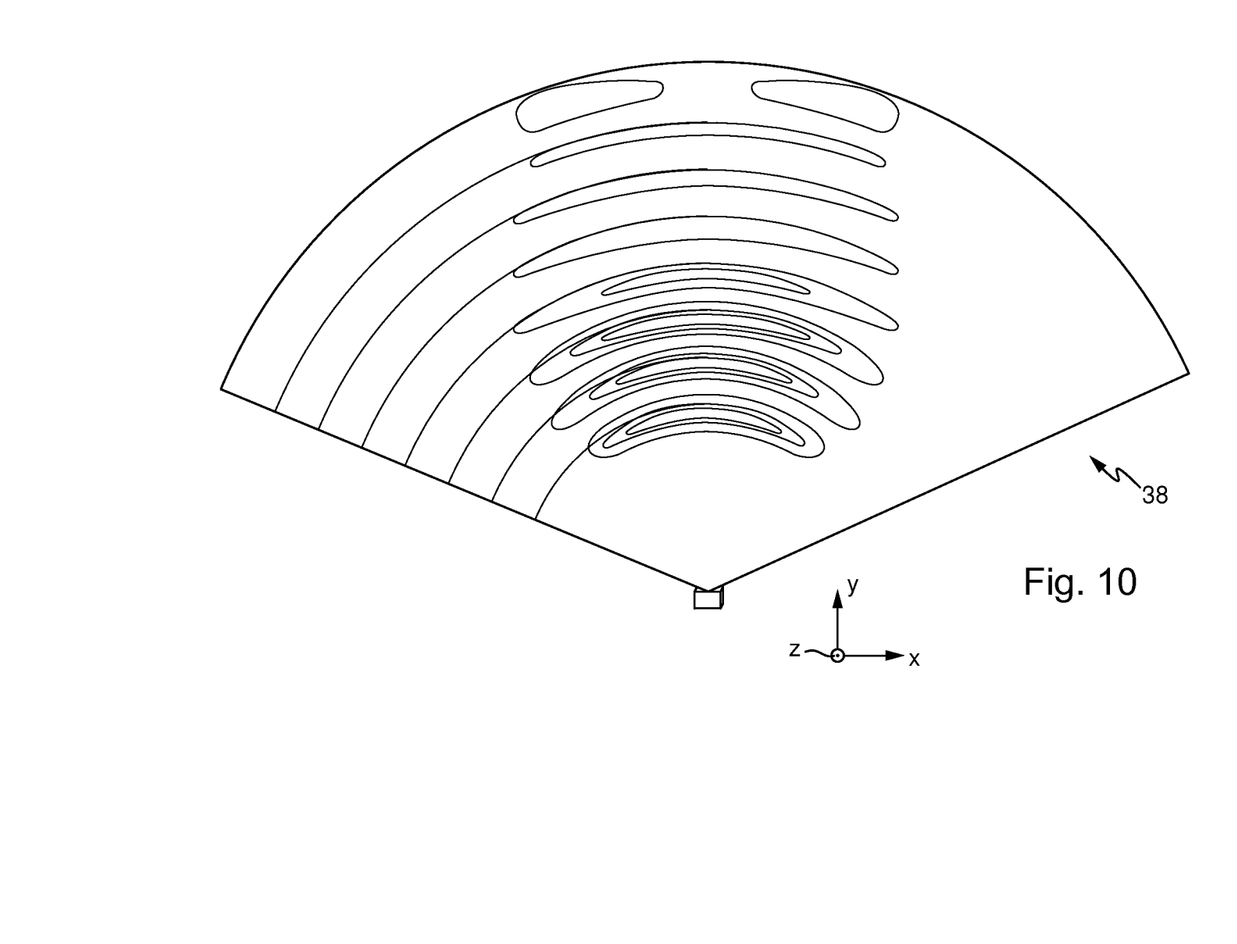
FIG. 10 is a simulation of the illuminance for the object of the FIGS. 6 to 8.

FIG. 10 illustrates a simulation of the illumination intensity for the object of FIGS. 6 to 9. The light conductor 38 is viewed from a position that lies in its emission direction z. The closed curves lying within the circular segment surface of the outer contours of the light conductor 38 have a shape symmetrical to the y-direction. They are characterized in that the brightness along any such line is constant; the brightness reduces from the curves lying further outside towards the curves lying further inside.

Figure 11:
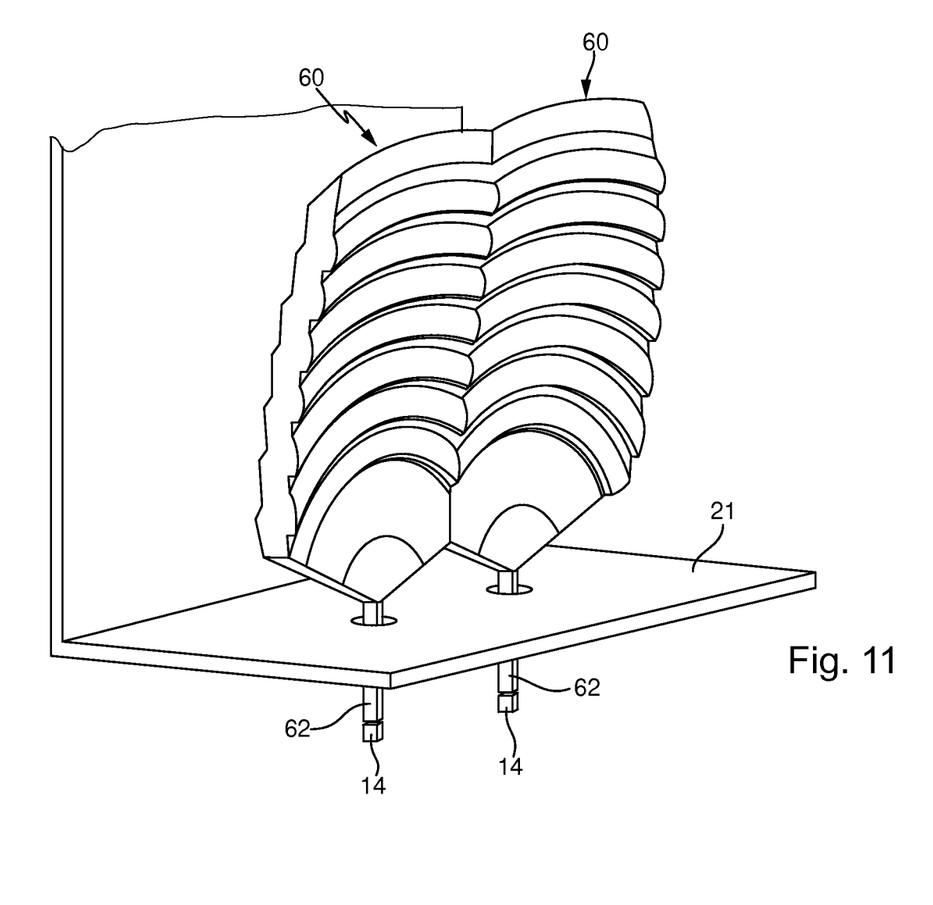
FIG. 11 is a light conductor configuration which is composed of modular designs of light conductors according to FIGS. 6-8.

FIG. 10 clarifies that the essential percentage of the luminous flux emitted from the light conductor 38 emerges from a rectangular area, which extends symmetrically to the right and to the left from the principal propagation direction y in the light conductor 38. It follows that without large losses of effectivity (i.e. without large losses of light), it is possible to cut off the dark areas lying in the positive and negative x-direction further outside, in which FIG. 9 no longer shows any closed plotted curves. Thus, an almost rectangular light conductor is created which can be considered a module. Such modules can be combined to a cohesive new light conductor, in which the individual modules are in contact on the rectangular sides which are created. FIG. 11 represents an embodiment of such a light conductor.

FIG. 11 illustrates a light conductor arrangement composed modular of designs of light conductors according to FIGS. 6 to 8, wherein the dark side areas according to FIG. 10 have been omitted. The configuration illustrated in FIG. 11 can be generated in that two light conductor modules 60 contact each other and are joined. As an alternative, it can also be generated by producing the illustrated form as an integral injection molding. FIG. 11 elucidates how it is possible to obtain a government regulated minimum luminous surface by joining of multiple modules 60, wherein each module 60 originates in that the dark side areas in a light conductor 38 (as illustrated in FIGS. 6 to 9) are omitted.

In the embodiment illustrated in FIG. 11, each module 60 is supplied with light by an inherent semiconductor light source 14. To prevent a direct view of the semiconductor source 14, or to obtain more favorable ambient temperatures for the light source, the semiconductor light source in the embodiment illustrated in FIG. 10 was installed below a non-transparent part (for example below a masking frame) which serves as a black shield 21. Here too, as an alternative to the illustrated design, the shield can be realized integrally with the heat sink of the semiconductor light sources 14. The light of the semiconductor light sources 14 is then provided by two feed lines 62 into the actual light conductor modules 60. When appropriately designed, the feed lines 62 serve as an additional focusing volume. This means that the feed lines 62 are preferably structured such that their cross-section (starting from their respective light incident surface) becomes continuously larger with increasing approximation to the actual light conductor modules 60, as was previously explained with reference to the focusing volume 28. Each of the two light conductors 60 generates a complete light distribution with respect to the angular distribution. By using multiple light conductor elements this will also produce the absolute brightness values which comply with government regulations for light distribution.

A further design provides for supplementary pillow optics on the cover plate 3. Each pillow is preferably set up such that it creates a complete light distribution with respect to the angular distribution. The superposition of the individual intensity light distributions of all pillow optics then results in the light distribution of the light function (for example the light distribution of a flashing light function). Overall, the light is made up from simple geometric surfaces, which have low requirements with respect to surface quality.

FIG. 11 substantiates the option to replace a Souffleuse reflector (half-shell reflector) with a light conductor. The efficiency is similarly high as with a Souffleuse reflector. An additional advantage compared to a Souffleuse reflector is a more homogeneous distribution of the illuminance. Further, it is possible to save on the aluminizing of the Souffleuse reflector, the required installation depth is less than for a Souffleuse reflector, and it is advantageous that such light conductor represents an additional design element.

What is claimed is:

1. A motor vehicle light with a light source, a light conductor, which comprises a decoupling volume that is bordered from a first side and a second side lying opposite the first side, wherein the second side includes deflection surfaces, which are configured to deflect light impinging on them toward the first side such that this light is decoupled there distributed about a principal emission direction, and wherein the motor vehicle light includes a colored shield, which is positioned behind the second side in a direction opposite to the principal emission direction, wherein the shield is a black shield, the first side includes individual decoupling surfaces that are spatially separated from each other and are offset relative to one another in the principal emission direction and that the deflection surfaces lying in the second side are likewise offset relative to one another in the principal emission direction, wherein the decoupling surfaces and the deflection surfaces are matched to each other, dimensioned and arranged such that in each case only one of the decoupling surfaces is illuminated from exactly one deflection surface from the second side and that the light conductor includes a focusing volume which lies between the light incident surface and the decoupling volume, which is configured to reduce the aperture angle of the light beam entering into the decoupling volume, wherein the light conductor includes one shading surface to one decoupling surface in each case, wherein each of said shading surfaces includes two partial surfaces that are disposed at a right angle relative to each other wherein one partial surface is a totally reflective boundary surface which lies in the decoupling volume parallel to the principal propagation direction of the light and which shades the subsequent decoupling surface against light in the direction of the light, which would impinge directly from the focusing volume onto the decoupling surface and thus without preceding reflection on a reflection surface, wherein one edge of the light conductor, which separates one partial surface of the shading surface from one decoupling surface, which is shaded by this shading surface, is an angular section with a first circular arc, that one edge that is bordering this decoupling surface on its side facing away from the partial surface is an angular section from a second circular arc concentric to the first circular arc and with a greater radius, the edges that border the associated deflection surface are angular sections of additional circular arcs that proceed concentrically to the first circular arc and the second circular arc, and the decoupling surfaces of the light conductor are curved convexly and disposed in arcs that are concentric and adjacent with respect to each other, wherein the convex curvature on the light conductor extends transversely to the circular arc of the edges that border the decoupling surfaces, and wherein the light source is arranged such that its principal emission direction is perpendicular to the concentric circular arcs, and that the light conductor comprises at least one segment that is delimited by two straight lines that are parallel to each other and to the light source's principal emission direction, wherein the principal propagation direction of the light coupled into the light conductor lies in a direction parallel to a y-direction, and the principal emission direction of the light decoupled by the first side lies parallel to the z-direction, wherein the x-direction, the y-direction, and the z-direction together form a right-handed oriented coordinate system.

2. The motor vehicle light as set forth in claim 1, wherein the light source is a semi-conductor light source, which includes one or multiple light emitting diodes.

3. The motor vehicle light as set forth in claim 1, wherein the black shield is identical or at least integral with a heat sink which exists anyway for the cooling of a semiconductor light source of the light.

4. The motor vehicle light as set forth in claim 1, wherein the black shield has the size of the light conductor and is positioned behind the light conductor such that it is visible when looking into the light.

5. The motor vehicle light as set forth in claim 1, wherein the form of the black shield is matched to the form of the light conductor.

6. The motor vehicle light as set forth in claim 1, wherein the black shield protrudes above the light conductor on at least one side, be it on the top and/or on the bottom and/or right and/or left, and thus surrounds said light conductor for a little distance.

7. The motor vehicle light as set forth in claim 1, wherein the light is a flashing light.

8. The motor vehicle light as set forth in claim 1, wherein the pairs from each one deflection surface and the associated decoupling surface are dimensioned such that the decoupling surfaces of different pairs appear to be equally bright for light coupled-in by the light incident surface.

* * * * *